June 25, 1968     J. R. REEDER ET AL     3,389,546
PROCESS AND APPARATUS FOR MAKING CONTINUOUS
STRINGS FROM ANIMAL GUT
Filed Oct. 20, 1965

*INVENTORS*
JERRY R. REEDER &
RAYMOND W. BERGMAN

BY

ATTORNEY

United States Patent Office 3,389,546
Patented June 25, 1968

3,389,546
PROCESS AND APPARATUS FOR MAKING CONTINUOUS STRINGS FROM ANIMAL GUT
Jerry R. Reeder and Raymond W. Bergman, Lockport, Ill., assignors to Ethicon Inc., a corporation of New Jersey
Filed Oct. 20, 1965, Ser. No. 498,975
17 Claims. (Cl. 57—35)

ABSTRACT OF THE DISCLOSURE

Continuous strings of indefinite length are made from short ribbons of animal gut by joining the ribbons end to end, feeding them (either continuously or intermittently) through a bath which may be water or some liquid which gives the desired permanent property to the gut, and twisting the gut into a round string while submerged in the bath. The twisting may be intermittent or continuous depending on whether the feed of the ribbon is intermittent or continuous. A number of parallel strips of joined ribbon may be twisted into a single round multiply string.

---

This invention relates to the making of continuous strings from animal gut and particularly to forming the gut into unlimited continuous lengths, and preparing and treating such continuous lengths.

The invention is particularly useful in making strings for surgical sutures, and it will be described, for illustration only, with such use in mind. However the invention is not limited to this use.

Heretofore in the manufacture of sutures from animal gut it has been necessary to process the gut in the relatively short lengths of the starting material, for example thirty feet. This has many well known disadvantages which result not only from the short lengths but also from the variation of physical and chemical characteristics from one specimen of gut to another.

It has long been desired to make continuous strings of animal intestines in which an average or composite of qualities is established, and which are suitable for surgical sutures. Methods of doing this and apparatus for doing it has been proposed, for example, those disclosed in the U.S. patents to Selby 2,391,483, 2,438,131 and 2,441,601. However none of the proposed methods or apparatus of others which have come to our attention can satisfactorily produce a continuous string of animal gut which can be formed into acceptable surgical sutures.

In seeking to overcome the disadvantages of known processes, our application for U.S. patent Serial No. 395,-261 filed September 9, 1964, now Patent No. 3,247,660 the disclosure of which is incorporated herein by reference, proposes to join short pieces of animal gut end to end and continuously spin or twist the joined ribbons into a round string. In so doing it has been necessary to keep the gut wet while spinning. In that application we propose to spray the spinning apparatus continuously with liquid, whether water or a chemical reagent, to keep the gut wet or to give it permanent physical and/or chemical properties while the gut is being spun. The process disclosed in our application has proved very successful but it has certain inherent limitations. We have discovered that it does not maintain the gut as wet as is desirable for satisfactory processing and uniform chemical treatment in spite of spraying the spinning apparatus continuously with liquid. We believe this is because the tension of the gut being wound onto the spinning package tends to squeeze liquid out of the gut, because the centrifugal force of the spinning package tends to throw liquid out of the gut, and because the speed of spinning of the package prevents the sprayed liquid ever from reaching the gut beyond the outermost surface of the package. It is also probable that the flyer, at the speed of spinning, tends to throw important amounts of liquid away from the gut before it can reach the gut from the spray device.

It has been proposed by Kuhn in U.S. Patent 1,006,654 to twist animal gut into strings while submerged in a bath but this process and the apparatus disclosed are limited to individual short lengths.

Another limitation of our previous proposal is that it has been necessary, as a practical matter, to maintain spools of joined ribbons of gut in wet storage for supplying to the spinning machine. It is desirable to store the joined ribbons dry.

It is an object of the invention to reduce or remove these disadvantages of previous processes and devices and to secure more uniform and reliable wetting and/or chemical treatment of the gut during its entire process up to the formation of a round twisted string ready for drying. More specifically it is an object of the invention to move a continuous ribbon of gut in the direction of its length progressively through a wetting bath or a chemical treatment bath and to spin it into a string and wind it into a package while submerged in the bath. As used herein, the term progressively means either intermittent or continuous progression of the strand through the bath.

Another object of our invention is to provide an improved system by which prepared continuous ribbon of gut formed by joining short pieces of gut end to end can be dried and stored indefinitely and conditioned and supplied to the spinning device when needed.

These and other objects of the invention will be evident from the accompanying drawings in which.

Figure 1:
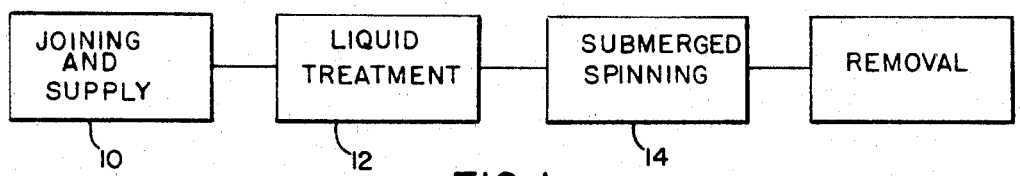
FIG. 1 is a flow diagram illustrating the squence of steps in a process embodying one form of our invention.

Referring to FIG. 1 we first join end to end in any suitable manner (for example as disclosed in our application referred to) enough strips of animal gut to form a continuous joined ribbon of suitable indefinite length, for example a mile. This may be done in a joining and supply tank 10 in which the gut may be submerged in water or any desired chemical reagent to give it the desired permanent physical and chemical properties. Or the gut may be wetted and softened in tank 10 and subsequently treated in reagent in a liquid treatment tank 12. The dotted lines connecting tanks 10 and 12 in FIG. 1 indicate that these may be the same tank or two separate tanks.

Then while the gut strip is submerged in water or a desired reagent it is spun into a round string by a submerged spinning device 14. Then the package of spun string is removed from the spinner and from the bath for further processing, such as drying or curing. The dotted lines connecting rectangles 12 and 14 indicate that the tank 12 may be separate, or a part of the submerged spinning device, that is, the liquid treatment step may be separate or may be combined with the spinning step.

From the tank 12 the joined continuous ribbon 16 either as a single ribbon for a one-ply string, or as a number of parallel ribbons for a multi-ply string, it led over guide rolls 18 and 20 into the tank 12 where the strand is submerged and fed into the spinning device, which includes a flyer 24 suitably journalled in the liquid and rotated at appropriate times by a drive belt 26 which schematically represents any suitable drive mechanism outside the bath. A spool 28 for winding the twisted string into a package is fixed to a shaft 30 suitably journalled in the liquid and splined in a drive pulley 32 rotated from outside the bath by any suitable drive such as belt 34. The shaft 30 may be moved back and forth axially in the flyer as by the traverse represented by double arrow 36.

The spindle flyer and spool may be constructed and arranged as shown in our application referred to with the exception that the spindle and the flyer are both individually positively driven intermittently by any suitable known device such as the belts 26 and 34.

Figure 2:
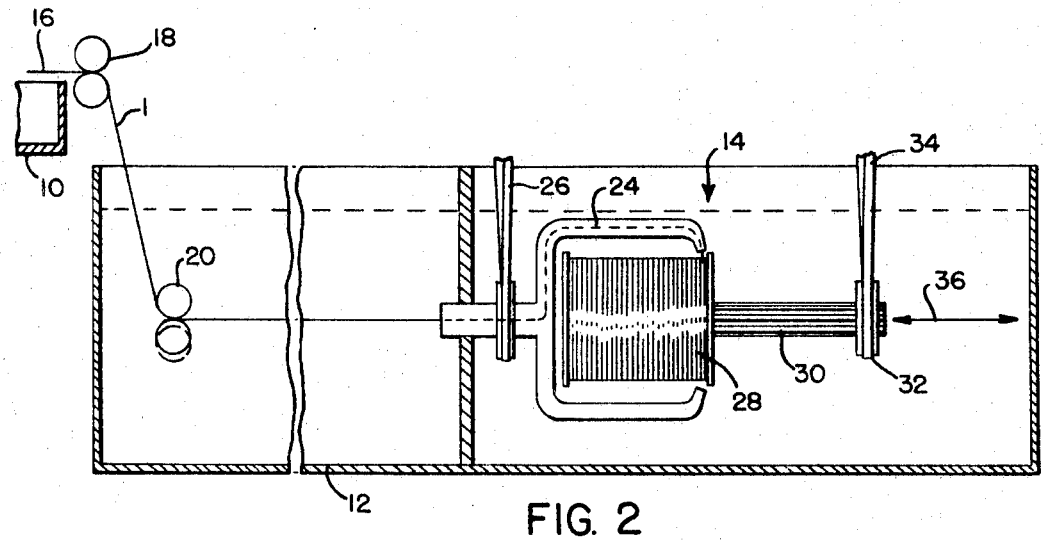
FIG. 2 is a diagrammatic illustration of one form of apparatus for practicing one form of our invention.

The twisting apparatus shown in FIG. 2 operates as follows:

Gut is first fed through the guide rolls 20, through the tank 12, through the flyer 24 and anchored to the spool 28 to be wound thereon. The rolls 20 are arranged either to be urged together to act as a clamp for the gut, or to be separated as indicated by the dotted line position of the lower roll. Now rolls 20 are pressed together to clamp the gut between them and the flyer 24 and spindle 30 are rotated at the same speed to twist the length of gut between the nip of the rollers 20 and the throat of the flyer. The twisted gut is not wound on the spool. Then the flyer is stopped, the clamp rolls 20 are released, and the spool is rotated a predetermined number of turns to wind into a package the length of gut which has been twisted in the tank 12. Now a new length of untwisted ribbon lies between the feed rolls and the flyer. At this point the rolls are again clamped, the flyer and the spool are rotated at the same speed to twist the new length of ribbon and the process is repeated indefinitely.

The above described process can be carried out by hand by controlling the clamping and unclamping of the rolls 20, the turning of the flyer and the spool, but preferably this is accomplished by any suitable known automatic timing and driving machinery, not shown.

After the desired length of twisted string has been wound in a package on the spool, the spool is removed from the bath for further processing of the gut, such as continuous drying as disclosed in our application referred to.

Our invention includes alternative procedures for handling the gut before it reaches the spinner.

(A) A number of separate pieces of gut may be placed at random and soaked in the tank 10 and there joined end-to-end in any suitable manner, for example by knotting as disclosed in our earlier application.

(B) The joined gut may be wound on spools and floated in the tank 10 as disclosed in our application.

(C) The joined gut may be dried and stored on spools or in open hanks, and before being spun it may be softened in water or chemical reagent either in the supply tank 10 or in the treatment tank 12 where the latter is separate from the container for the submerged spinner.

Figure 3:
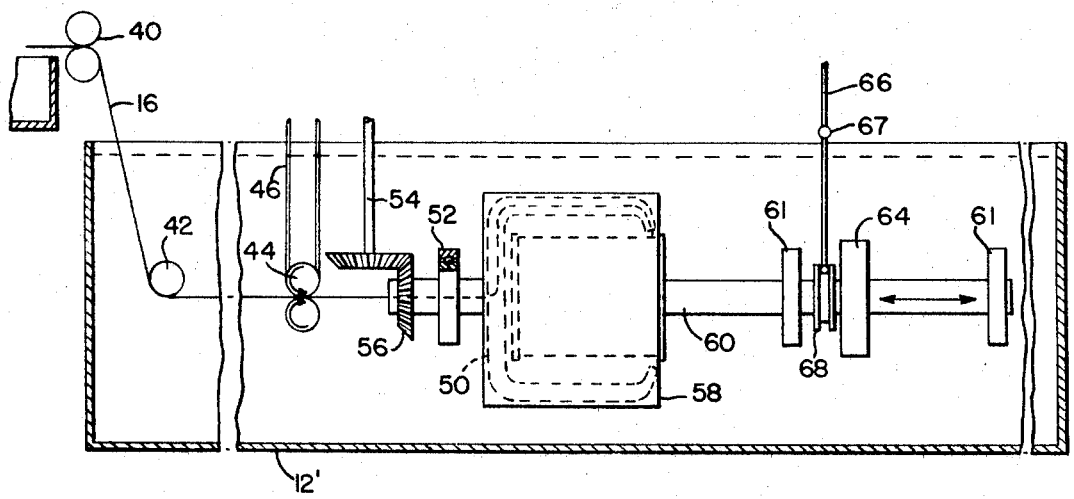
FIG. 3 is a diagrammatic illustration of another form of apparatus for carrying out our invention.

Alternatively the single joined ribbons or plurality of joined ribbons can be spun continuously without interruption by the apparatus shown diagrammatically in FIG. 3. One or more strips of joined gut 16 may be fed into the tank 12' containing water or any suitable treating liquid which gives the desired properties to the gut. A first pair of feed rolls 40 driven by any suitable known means, not shown, feeds the strip 16 continuously over a guide roll 42 to a second pair of feed rolls 44 which may be driven by means outside of the tank represented by drive belt 46. The distance between the feed rolls 44 and 40 and the rate of feed of the strip is such as to give the strip the desired exposure to the liquid in the tank.

Beyond the feed rolls 40 is a spinning device or twisting device which may be constructed in general as shown in our application referred to. This may include a flyer 50 of usual construction journalled in a bearing 52, supported in the liquid and rotated by any suitable means outside the tank diagrammatically illustrated as a driving shaft 54 and beveled gearing 56. The flyer may be rotated at usual spinning speeds for example 3600 r.p.m.

To avoid undue agitation of the liquid by the flyer arms, the flyer is surrounded by a cylindrical shroud 58 which may be either stationary or may rotate with the flyer and may be closed at one end if desired. A spindle 60 mounted in bearings 61 supports a spool 62 so that the latter is rotatable inside of the flyer. The spool is fixed to the spindle and the spindle is freely rotatable under the tension of the twisted string being laid on the spool by the flyer and as is customary. The spool is retarded by any suitable drag brake 64 fixed to the spindle so that the spool maintains a slightly slower speed than that of the flyer, for example 3550 r.p.m.

The spool may be cyclically traversed within the flyer with any suitable traversing device diagrammatically represented as a cyclically operating lever 66 pivoted at 67 and having a forked end disposed in a collar 68. This is to lay the twisted strings evenly upon the spool in a package as is known. The feed rolls 40 and 44 and flyer are driven synchronously at suitable related speeds, by any suitable apparatus as is known in the spinning art.

After the package has been completed, for example, by laying on approximately a mile of twisted string, the machine is stopped and the package removed from the bath for further processing.

Both these arrangements assure that the gut is immersed in the liquid throughout its entire period of being spun or twisted and rotation of the spool does not tend to prevent access of liquid to the interior layers or fibers of the gut.

We claim as our invention:

1. In a method of making continuous strings of indefinite length from short pieces of animal gut the improvement which includes joining together end-to-end a series of flat ribbons of animal gut, progressively moving the joined gut in the direction of its length in a liquid bath and progressively twisting the joined gut into a round string while the gut is submerged in the bath.

2. In a method of making continuous strings of indefinite length from short pieces of animal gut the improvement which includes joining together end-to-end a series of flat ribbons of animal gut, progressively moving the joined gut in the direction of its length in a bath of liquid which permanently changes the properties of the gut and progressively twisting the joined gut into a round string while the gut is submerged in the bath.

3. In a method of making continuous strings of indefinite length from short pieces of animal gut the improvement which includes joining together end-to-end a plurality of series of flat ribbon of animal gut, progressively moving the plurality of flat ribbons side-by-side in the direction of their length in a liquid bath and progressively twisting the plurality of ribbons of joined gut into a round string while the gut is submerged in the bath.

4. Apparatus for making continuous strings of indefinite length from short pieces of animal gut comprising in combination a container for a liquid bath, means for moving a joined ribbon of gut in the direction of its length through the bath, and means in the bath for progressively twisting the ribbon into a round string.

5. Apparatus for making continuous strings of indefinite length from short pieces of animal gut comprising in combination a container for liquid, means for progressively moving a joined ribbon of gut in the direction of its length into the liquid, and means in the liquid and for progressively twisting the ribbon into a round string for winding the twisted string into a package.

6. Apparatus for making continuous strings of indefinite length from animal gut which comprises in combination a container for liquid, means for feeding a joined ribbon of gut in the direction of its length into the liquid, means in the liquid for feeding the ribbon to a twister, means outside the liquid for driving the feeding means, a flyer journalled in the liquid for receiving the ribbon from the feeding means and twisting it into a round string, a shroud surrounding the flyer, means outside the liquid for rotating the flyer, a spindle in the liquid for supporting a package-receiving element for receiving the twisted string, and means in the liquid for axially traversing the package with respect to the flyer.

7. Apparatus for making continuous strings of indefinite length from animal gut which comprises in combination a container for liquid, means for feeding a joined ribbon of gut in the direction of its length into the liquid, means in the liquid for feeding the ribbon to a twister, means for driving the feeding means, a flyer journalled in the liquid for receiving the ribbon from the feeding means and twisting it into a round string, a shroud surrounding the flyer, means for rotating the flyer, and a spindle in the liquid for supporting a package-receiving element for receiving the twisted string.

8. Apparatus for making continuous strings of indefinite length from animal gut which comprises in combination a container for liquid, means for feeding a joined ribbon of gut in the direction of its length into the liquid, means in the liquid for feeding the ribbon to a twister, means for driving the feeding means, a flyer journalled in the liquid for receiving the ribbon from the feeding means and twisting it into a round string, means for rotating the flyer, and a spindle in the liquid for supporting a package-receiving element for receiving the twisted string.

9. In a method of making continuous strings of indefinite length from animal gut the improvement which includes joining end-to-end a series of flat ribbons of animal gut, continuously moving the joined gut in the direction of its length into a liquid bath, and twisting the joined gut into a round string while continuously moving the gut in the direction of its length in the bath.

10. In a method of making continuous strings of indefinite length from animal gut the improvement which includes joining end-to-end a series of flat ribbons of animal gut, continuously moving the joined gut in the direction of its length into a bath of liquid which changes the properties of the gut and twisting the joined gut into a round string while continuously moving the gut in the direction of its length in the bath.

11. In a method of making continuous strings of indefinite length from animal gut the improvement which includes joining together end-to-end a plurality of series of flat ribbons of animal gut to form a plurality of joined ribbons, continuously moving the joined ribbons in the direction of their length into a liquid bath, and twisting the ribbons into a round string while continuously moving the gut in the direction of its length in the bath.

12. In a method of making continuous strings of indefinite length from animal gut the improvement which includes joining together end-to-end a series of flat ribbons of animal gut, continuously feeding the joined gut in the direction of its length into a liquid bath, continuously twisting the joined gut into a round string while continuously moving the gut in the direction of its length in the bath, and continuously winding the twisted string into a package in the bath.

13. Apparatus for making continuous strings of indefinite length from animal gut comprising in combination a container for liquid, means for feeding a joined ribbon of gut in the direction of its length into the bath, and means in a bath for progressively twisting the ribbon into a round string.

14. Apparatus for making continuous strings of indefinite length from animal gut comprising in combination a container for liquid, means for guiding a continuous joined ribbon of gut in the direction of its length into the liquid, means in the liquid for preventing rotation of one end of a length of the continuous ribbon, means in the liquid separated from the preventing means for rotating the other end of said length of the continuous ribbon to twist the length into a round string, and means for winding the round string into a package.

15. Apparatus for making continuous strings of indefinite length from animal gut comprising in combination a container for liquid, means for guiding a continuous joined ribbon of gut in the direction of its length into the liquid, means in the liquid for intermittently preventing rotation of one end of a length of the continuous ribbon, means in the liquid separated from the preventing means for intermittently rotating the other end of said length of the continuous ribbon to twist the length into a round string, and means for intermittently winding the round string into a package.

16. Apparatus for making continuous strings of indefinite length from animal gut comprising in combination a container for liquid, means for guiding a continuous joined ribbon of gut in the direction of its length into the liquid, means in the liquid for intermittently preventing rotation of one end of a length of the continuous ribbon, means in the liquid separated from the preventing means for intermittently rotating the other end of said length of the continuous ribbon to twist the length into a round string and for rotating about the twisting axis all of the twisted string, and means for intermittently winding the round string into a package.

17. Apparatus for making continuous strings of indefinite length from animal gut comprising in combination a container for liquid, a releasable clamp in the liquid for preventing rotation of one end of a length of gut ribbon, a flyer in the liquid separated from the clamp, a spindle in the liquid for winding string from the flyer, means for rotating the flyer and the spindle at the same speed while the clamp prevents rotation to twist into a round string a length of continuous ribbon, and means for rotating the spindle alone while the clamp is released and while the flyer is not rotating for winding the twisted length into a package.

References Cited

UNITED STATES PATENTS

| | | | |
|---|---|---|---|
| 2,334,170 | 11/1943 | Bjorkman | 57—35 |
| 2,410,509 | 11/1946 | Lange | 57—35 X |
| 2,441,601 | 5/1848 | Selby et al. | 57—35 |
| 2,558,734 | 7/1951 | Gresswell | 68—181 |
| 2,940,248 | 6/1960 | Lang | 57—162 |
| 3,189,401 | 6/1965 | Griest | 128—335.5 X |
| 3,247,660 | 4/1966 | Reeder et al. | 57—35 |

OTHER REFERENCES

Hamel, German application 1,136,251, printed September 1962.

FRANK J. COHEN, *Primary Examiner.*

W. H. SCHROEDER, *Assistant Examiner.*